United States Patent

Wilkins, Jr.

[11] Patent Number: 5,314,202
[45] Date of Patent: May 24, 1994

[54] GOLF CAR TOWING HITCH SYSTEM

[76] Inventor: Guy Wilkins, Jr., 1719 Binford St., Ogden, Utah 84401

[21] Appl. No.: 970,149

[22] Filed: Nov. 2, 1992

Related U.S. Application Data

[63] Continuation-in-part of Ser. No. 756,897, Sep. 9, 1981, abandoned.

[51] Int. Cl.⁵ ............................................. B60P 3/12
[52] U.S. Cl. .............................. 280/511; 280/425.1; 280/292; 280/DIG. 5
[58] Field of Search ............ 280/504, 511, 512, 425.1, 280/292, DIG. 5

[56] References Cited

U.S. PATENT DOCUMENTS

| | | | |
|---|---|---|---|
| 2,669,423 | 2/1954 | Pehrsson | 280/425.1 X |
| 3,066,983 | 12/1962 | Bay | 280/425.1 X |
| 4,162,086 | 7/1979 | Bond et al. | 280/425.1 |
| 4,678,199 | 7/1987 | Dickmann | 280/511 X |
| 4,768,803 | 9/1988 | Hewitt et al. | 280/511 X |
| 4,863,185 | 9/1989 | Ceppe | 280/511 X |
| 4,946,182 | 8/1990 | Weber | 280/425.1 X |

Primary Examiner—Joseph D. Pape
Attorney, Agent, or Firm—Jon C. Christiansen; Daniel P. McCarthy

[57] ABSTRACT

A golf car towing hitch system for towing a three or four wheeled golf car behind a passenger vehicle or light truck with the rear two wheels of the golf car elevated off of the ground. A hoist mounted on a rotable mast for lifting the rear of the golf car is included. Receiver or bar hitches may be used.

18 Claims, 3 Drawing Sheets

GOLF CAR TOWING HITCH SYSTEM

This application is a continuation-in-part of application Ser. No. 07/756,897, filed Sep. 9, 1991, now abandoned.

BACKGROUND OF INVENTION

A. The Field of the Invention

This invention relates to the field of devices for towing a golf car behind a tow vehicle. Specifically, hitch and hoist combinations which allow a golf car to be towed by a common passenger vehicle or light truck with the rear wheels of the golf car raised off the ground and the front wheel or wheels in contact with the road are disclosed and claimed.

B. The Background Art

In the prior art, golf cars were not towed directly by a tow vehicle. Transportation of golf cars in the prior art was accomplished by placing the golf car onto a trailer and towing the trailer behind a tow vehicle. The need to use a trailer to tow a golf car had the disadvantages of being expensive because it was necessary to purchase, register and insure a trailer, difficult to maneuver due to inherent trailer size, weight and control characteristics, and burdensome to tow in terms of weight because the tow vehicle had to tow the combined weight of the golf car and trailer. When the trailer was not in use, it had to be stored in a driveway or garage.

II. SUMMARY OF THE INVENTION

It is an object of the invention to provide a golf car towing hitch system which allows a golf car to be towed directly behind a tow vehicle without the use of a trailer. It is a further object of the invention to provide a golf car towing hitch system with a hoist mechanism for raising the rear wheels of a golf car off the ground so that the golf car may be hitched to the tow vehicle and towed with only the front wheel or wheels of the golf car contacting the road. It is a further object of the invention to provide a golf car towing hitch system which has two tow ball mounting positions for use with either a passenger car or light truck depending on height requirements. It is a further object of the invention to provide a rotable hoist assembly that will allow for imprecise positioning of the tow vehicle with respect to the golf car and cause the golf car to move into position for hitching and towing. It is a further object of the invention to provide a golf car towing hitch system for use on a tow vehicle with a receiver hitch. It is a further object of the invention to provide a golf car towing hitch system for use on a tow vehicle having a bar hitch. It is a further object of the invention to provide a golf car towing hitch system for use with a four-wheeled golf car. It is a further object of the invention to provide a golf car towing hitch system for use with a three-wheeled golf car. It is a further object of the invention to provide a golf car towing hitch system which may be assembled in under two (2) minutes. It is a further object of the invention to provide a golf car towing hitch system which can be stored in a small space such as in the trunk of a car, on the wall of a garage, or on the back of a golf car. Further objects and advantages of the invention will become apparent to those skilled in the art.

III. BRIEF DESCRIPTION OF THE DRAWINGS

IV. DETAILED DESCRIPTION OF THE PREFERRED EMBODIMENT

The invention provides an alternative to transporting a golf car by use of a trailer towed behind a tow vehicle. The invention is a golf car towing hitch system which has a rotable hoist for elevating the rear wheels of the golf car from the road and bringing the golf car into position for hitching with the tow vehicle. The golf car is then towed with its rear wheels off of the ground.

It is necessary to tow a golf car either on a trailer or with its rear wheels elevated off of the ground to avoid damaging the golf car drive system. Golf cars are powered by use of an electric motor or gasoline engine connected by belt and pulleys to the rear axle. If the golf car is towed with its rear wheels on the ground at speeds typical for driving a passenger car on public roadways, the electric motor or gasoline engine, belt and pulleys of the golf car will engage and turn at the speed that the towing automobile is travelling. This not only creates unnecessary friction and load on the tow automobile, it also damages the drive system of the golf car by causing it to turn continuously and at speeds greater than that for which it was designed.

Figure 1:
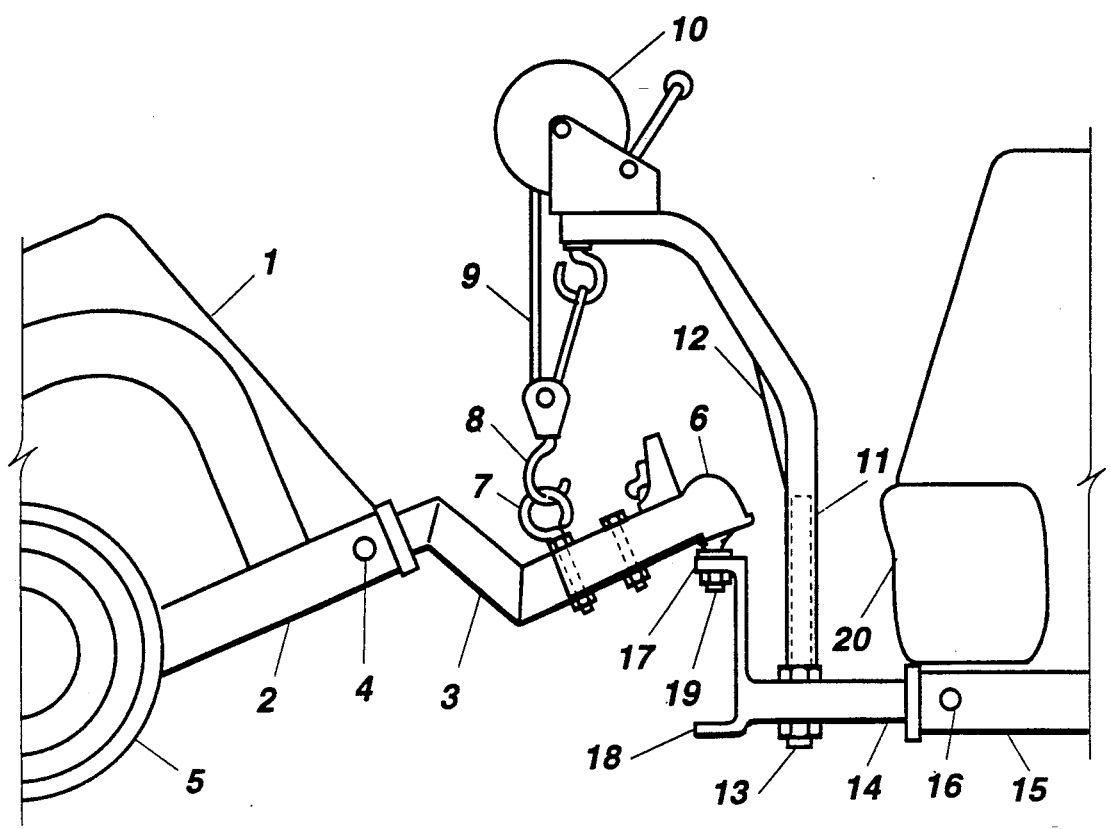
FIG. 1 depicts a side view of a golf car towing hitch system for use with a four-wheeled golf car and a tow vehicle equipped with a receiver hitch.

Referring to FIG. 1, one embodiment of the invention is shown. The embodiment is a golf car towing hitch system for use with a four-wheeled golf car and a tow vehicle equipped with a receiver hitch. The golf car 1 is equipped with a receiver 2 which is typical of receiver hitches in the prior art. The receiver 2 centrally mounted under the rear of the golf car 1 and is positioned to receive an offset towing tongue 3. The offset tongue serves as a means for connecting the receiver mounted on the rear of the golf car to a ball hitch. The offset tongue 3 is secured into place by a pin 4 for towing. The offset tongue 3 is also constructed of hollow tubular steel which is square in longitudinal cross section. The offset is chosen to allow adequate clearance of the rear wheels 5 of the golf car 1 above the ground when being towed. A lockable ball hitch socket 6 is attached to one end of the offset tongue 3.

Between the ball hitch socket 6 and the pin 4 is mounted a bolt eye 7 on the top side of the towing tongue 3. A pulley with hook 8 is removably connected to the bolt eye 7 so that a rope, cable, cord or strap 9 may lift the offset tongue 3 and rear wheels 5 of the golf car 1 by use of a hoist 10. This assembly serves as a means for lifting the rear of a golf car. When the rear of a golf car is lifted or raised, the two rear wheels of the golf car are positioned off of the ground allowing movement of the golf car to align the lockable ball hitch socket with the hitch ball and then towing. In the preferred embodiment, the hoist 10 is manually operated such as those commonly found on boat trailers. An electric winch could be substituted for a manual hoist.

The hoist 10 is attached to the upper portion of a rotable hoist mast 11. The rotable hoist mast 11 is constructed of hollow steel pipe which is bent to locate the hoist directly over the bolt eye 7 for hoisting the offset tongue 3 and rear wheels 5 of the golf car 1. The rotable hoist mast 11 is strengthened with a reinforcing bar 12. The rotable hoist mast 11 rotates on a standard long bolt 13 mounted vertically through a hitch tongue 14 which slides into a tow vehicle receiver 15 and is secured for towing by a pin 16. The hitch tongue is a means attachable to the rear of a tow vehicle for supporting a ball.

The hitch tongue 14 has two ball mounting positions 17 and 18 for mounting a ball 19. These are means for adjusting the height of a ball supported the hitch tongue. The upper mounting position 17 is used when a golf car is being towed by an ordinary passenger vehicle 20. The upper mounting position 17 is of proper height achieve the necessary clearance between the golf car rear wheels 5 and the road. When a pickup truck or other taller tow vehicle is used, the hitch tongue 14 is rotated 180 degrees about its longitudinal axis to utilize its lower mounting position 18. The ball socket 6 is then positioned on and locked to the ball 19.

In the preferred embodiment, the offset tongue 3 is constructed of 2"×2" steel tubing which is square in longitudinal cross section having 3/16" thick walls. The offset tongue 3 is 16" long with two 60 degree offset angles approximately 5" apart creating a 4" offset in height. By removing the ball hitch socket 6, rotating the offset tongue 3 180 degrees, and reattaching the ball hitch socket 6, a variation of 8" in golf car towing height can be achieved.

Also in the preferred embodiment, the hitch tongue 14 is constructed of 2"×2" steel tubing which is square in longitudinal cross section having 3/16" thick walls. The hitch tongue 14 is 15" long with an 8" yoke at one end and a 11/16" hole to accommodate a pin located 1" from the other end. By attaching the ball 19 to either the upper mounting position 17 or the lower mounting position 18, an 8" variation in hall height can be achieved. Position 17 is intended for use with passenger cars and position 18 is intended for use with light trucks.

Combining the adjustment of the offset tongue 3 with that of the hitch tongue 14, a total variation of 16" in hitch height can be achieved. Intermediate adjustment is also possible by selecting the proper rotational adjustment for the offset tongue 3 and the hitch tongue 14. This feature compensates for different heights of passenger cars and light trucks. The offset tongue and the hitch tongue with two ball mounting positions serve as means for adjusting the height of a ball.

Figure 2:
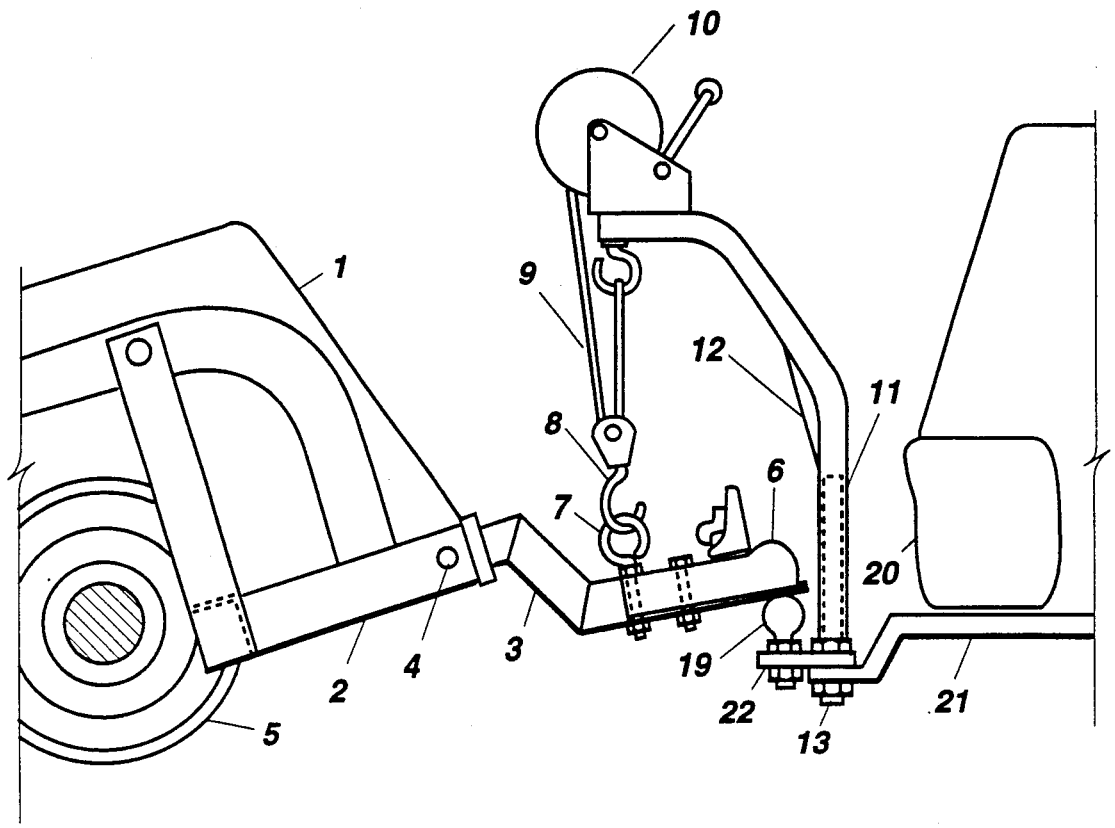
FIG. 2 depicts a side view of a golf car towing hitch system for use with a four-wheeled golf car and a tow vehicle equipped with a bar hitch.

Referring to FIG. 2, another embodiment of the invention is shown. The embodiment is a golf car towing hitch system for use with a four-wheeled golf car and a tow vehicle equipped with a bar hitch. Substantially the same components are used as depicted in FIG. 1, but a bar hitch 21 is substituted for a receiver hitch 15 on the tow vehicle 20. Onto the bar hitch 21 the rotable hoist mast 11 is bolted in conjunction with a flat bar hitch extension 22 whereupon the ball 19 is mounted. This embodiment allows towing of a golf car with an inexpensive bar hitch 21 in place of a costly receiver hitch 15.

Figure 3:
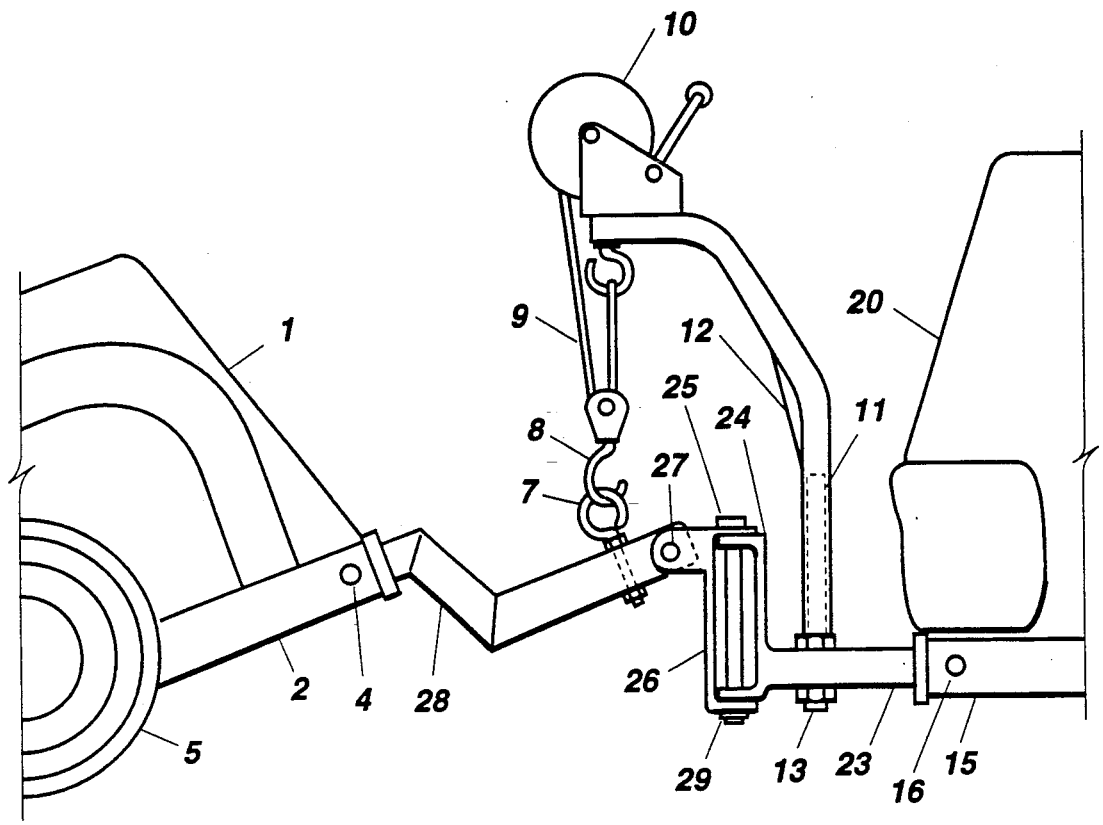
FIG. 3 depicts a side view of a golf car towing hitch system for use with a three-wheeled golf car and a tow vehicle equipped with a receiver hitch.

Referring to FIG. 3, another embodiment of the invention is shown. The embodiment is a golf car towing hitch system for use with a three-wheeled golf car and a tow vehicle equipped with a receiver hitch. Substantially the same components are used as depicted in FIG. 1, but different tongue assemblies are employed. A specially adapted jointed offset tongue 28 is inserted into the golf car receiver 4 and secured by a pin 4. At the end of the tongue 28 opposite the pin 4 is a joint 27 to allow for vertical sway or pivoting between the golf car 1 and the tow vehicle 20.

A specially adapted hitch tongue 23 is inserted into the receiver 15 of the tow vehicle and secured by a pin 16. The rotable hoist mast 11 is affixed to the hitch tongue 23 shaft by its long bolt 13. The hitch tongue 23 has a jointed portion 24 configured to work in conjunction with a jointed portion 26 of the offset tongue 28. A pin or bolt 25 secures jointed portions 24 and 26 to allow horizontal sway or movement between the tow vehicle 20 and golf car 1. This combination provides for low-friction vertical and horizontal movement between the tow vehicle and golf car during towing.

In the preferred embodiment, offset tongue 28 is constructed of 2"×2" steel tubing which is square in longitudinal cross section having 3/16" thick walls. The offset tongue 28 is 24" long with two (2) 60 degree offset angles approximately 5" apart creating a 4" offset in height. An 11/16" pin hole is provided 1" from each end. Vertical pivoting is accomplished at joint 27 by attaching the offset tongue 28 to jointed portion 26 with a bolt and nut at joint 27.

Hitch tongue 23 is constructed of 2"×2" steel tubing which is square in longitudinal cross section having 3/16" thick walls. Hitch tongue 23 is 16" long with jointed portion 24 being 8" in height and serving as a yoke for horizontal pivoting motion. On hitch tongue 23 opposite jointed portion 24 is an 11/16" pin hole located 1" from the end of the hitch tongue 23. Jointed portion 26 is attached to jointed portion or yoke 24 with an 11/16" bolt 25 which is installed through both bolt holes of jointed portions 24 and 26, and secured by nut 29. Rotating hitch tongue 23 by 180 degrees results in a variation of 12" in hitch height.

Manufacture of the various embodiments of the invention is accomplished using steel cutting, welding, bending and drilling techniques well known to those of ordinary skill in the art. Bolts, nuts and washers used for assembly are typical of those found in most hardware stores. Pins used are typical of those used in most receiver hitch assemblies in the prior art.

For towing, the following assembly sequence is typical. Referring to FIG. 1, the hitch tongue 14 with ball 19 mounted in the appropriate mounting position 17 or 18 is inserted into the tow vehicle receiver 15 and secured with a pin 16. The golf car 1 is then backed into position behind the tow vehicle 20. Next, the offset tongue 3 is slid into the golf car receiver 2 and secured by a pin 4. The hoist mast 11 is mounted on its bolt 13 and the cable 9 and pulley 8 connected to the bolt eye 7 on the offset tongue 3. The hoist 10 is then used to lift the offset tongue 3 until the rear wheels 5 of the golf car 1 are raised off of the ground and the ball hitch socket 6 is at a higher height than the ball 19. The rotable mast 11 is then rotated until the ball socket 6 is directly above the ball 19. This moves the golf car 1 into proper position for hitching even if it was not placed into precisely the proper position initially. Then the hoist 10 is used to lower the ball socket 6 onto the ball 19, and the ball socket 6 is locked into place. Finally, the steering wheel of the golf car is secured in place by a cable, rope or bungee cord with the golf car front wheel(s) centrally aligned for towing.

Assembly of the a golf car towing hitch system for use with a three-wheeled golf car is similar except that the golf car must be balanced when connecting the hitch because the golf car rests on a single front wheel.

During towing, the hoist cable 9 can be left attached or the entire mast 11 and hoist 10 combination can be removed and stored elsewhere. The golf car is towed as a simple one or two wheel trailer.

Prototype versions of the golf car towing hitch systems disclosed herein have been tested using both three and four wheel golf cars with great success. The hitch systems were tested on highways and on secondary roads at speeds of up to 60 miles per hour with excellent performance. Assembly of the golf car towing hitch system and attaching a golf car for towing can typically be accomplished in 1.5 to 2 minutes. The small size and light weight of the preferred embodiment of the golf car towing hitch system allow even physically small or frail individuals to use it without assistance. When the golf car towing hitch system is not in use it may be disassembled and stored in a car trunk, on the back of a golf car, on the wall of a garage, or in various other small spaces.

While certain embodiments of the present invention have been illustrated and described herein, the invention is not to be limited to the specific forms or arrangements shown. Various modifications and applications may occur to those skilled in the relevant art without departing from the true spirit and scope of the invention, and are intended to be comprehended within the scope of the claims and their equivalents.

I claim:

1. A towing hitch system for towing a golf car comprising:
    (a) supporting means for supporting a ball, said supporting means being attachable to the rear of a tow vehicle,
    (b) a ball supported by said supporting means,
    (c) connecting means for connecting the golf car to said ball, said connecting means being attachable to the rear of a golf car, and
    (d) lifting means for lifting the rear of a golf car to bring said connecting means into alignment with said ball.

2. A towing hitch system as recited in claim 1 wherein said supporting means further comprises a plurality of ball mounting positions.

3. A towing hitch system as recited in claim 1 wherein said supporting means is a hitch tongue attachable to a receiver mounted on a tow vehicle, said hitch tongue being capable of supporting a ball.

4. A towing hitch system as recited in claim 3 wherein said connecting means is an offset tongue attachable to a receiver mounted on the rear of a golf car.

5. A towing hitch system as recited in claim 4 wherein said lifting means is a mast rotably mounted on the shaft of said hitch tongue, said mast having a hoist affixed to one end of said mast and said hoist being capable of applying an upward force on said offset tongue to lift the rear of a golf car.

6. A towing hitch system as recited in claim 2 wherein said plurality of ball mounting positions comprises two receptacles for mounting a ball, each receptacle located at a different vertical height.

7. A towing hitch system as recited in claim 1 wherein said supporting means is a bar hitch extension mountable to a bar hitch mounted to a tow vehicle, said bar hitch extension being capable of supporting a ball.

8. A towing hitch system as recited in claim 7 wherein said connecting means is an offset tongue attachable to a receiver mounted on the rear of a golf car.

9. A towing hitch system as recited in claim 7 wherein said lifting means is a mast rotably mounted on the shaft of said supporting means, said mast having a hoist affixed to one end of said mast and said hoist being capable of applying an upward force to lift the rear of a golf car.

10. A towing hitch system for towing a golf car comprising:
    (a) an offset tongue attachable to a receiver mounted on the rear of a golf car, said offset tongue having a locking ball socket on one end and a bolt eye along its shaft,
    (b) a hitch tongue attachable to a receiver mounted on a tow vehicle, said hitch tongue having a ball for engagement with said locking ball socket, and
    (c) a mast rotably and removably mounted on the shaft of said hitch tongue, said mast having a hoist affixed to one end of said mast, and said hoist being capable of applying an upward force on said bolt eye to raise said offset tongue and lift the rear of a golf car and bring said locking ball socket into position for engagement with said ball.

11. A towing hitch system as recited in claim 10 wherein said hoist is manually operated.

12. A towing hitch system as recited in claim 10 wherein said hoist is an electric winch.

13. A towing hitch system as recited in claim 10 wherein said hitch tongue further comprises a plurality of ball mounting positions.

14. A towing hitch system for towing a golf car comprising:
    (a) an offset tongue attachable to a receiver mounted on the rear of a golf car, said offset tongue having a locking ball socket on one end and a bolt eye along its shaft;
    (b) a bar hitch extension attachable to a bar hitch mounted on a tow vehicle, said bar hitch extension having a ball for engagement with said looking ball socket; and
    (c) a mast rotably and removably mountable onto said bar hitch extension, said mast having a hoist affixed to one end of said mast and said hoist being capable of applying an upward force on said bolt eye to raise said offset tongue and lift the rear of a golf car and bring said locking ball socket into engagement with said ball.

15. A towing hitch system for towing a golf car comprising:
    (a) an offset tongue attachable to a receiver mounted on the rear of a golf car, said offset tongue having a pivot point with a generally horizontally disposed axis to allow for vertical pivoting between a golf car and a tow vehicle, and having a bolt eye along its shaft;
    (b) a hitch tongue attachable to a receiver mounted on a tow vehicle, said hitch tongue being connectable to said offset tongue and said hitch tongue having jointed portions with a generally vertically disposed axis to allow horizontal movement between the golf car and a tow vehicle; and
    (c) a mast rotably and removably mountable on the shaft of said hitch tongue, said mast having a hoist affixed to one end of said mast, said hoist being capable of applying an upward force on said bolt eye to raise said offset tongue and lift the rear of the golf car.

16. A towing hitch system as recited in claim 15 wherein said hoist is a manually-operated winch.

17. A towing hitch system as recited in claim 15 wherein said hoist is an electric winch.

18. A towing hitch system for towing a golf car comprising:

(a) an offset tongue attachable to a receiver mounted on the rear of a golf car, said offset tongue having a bolt eye along its shaft, .

(b) a hitch attachable to a tow vehicle, said hitch having a shaft and means for engagement with said offset tongue;

(c) a mast mounted on the shaft of said hitch, said mast having a hoist affixed to one end of said mast, and said hoist being capable of applying an upward force on said bolt eye to raise said offset tongue and lift the rear of a golf car and bring said offset tongue into position for engagement with said hitch.

* * * * *